United States Patent
Fujii

(10) Patent No.: US 11,867,821 B2
(45) Date of Patent: Jan. 9, 2024

(54) SYSTEM, RADIO RELAY APPARATUS, INFORMATION PROCESSING APPARATUS AND METHOD FOR SPECIFYING POSITION OF TERMINAL APPARATUS

(71) Applicant: SoftBank Corp., Tokyo (JP)

(72) Inventor: Teruya Fujii, Tokyo (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 18/253,234

(22) PCT Filed: Oct. 6, 2021

(86) PCT No.: PCT/JP2021/037042
§ 371 (c)(1),
(2) Date: May 17, 2023

(87) PCT Pub. No.: WO2022/113531
PCT Pub. Date: Jun. 2, 2022

(65) Prior Publication Data
US 2023/0333256 A1 Oct. 19, 2023

(30) Foreign Application Priority Data
Nov. 24, 2020 (JP) .................................. 2020194579

(51) Int. Cl.
*G01S 19/11* (2010.01)
*H04B 17/27* (2015.01)

(52) U.S. Cl.
CPC ............ *G01S 19/115* (2019.08); *H04B 17/27* (2015.01)

(58) Field of Classification Search
CPC .............................. G01S 19/115; H04B 17/27
(Continued)

(56) References Cited

U.S. PATENT DOCUMENTS

2018/0319495 A1* 11/2018 Tu ........................ B64C 39/024

FOREIGN PATENT DOCUMENTS

| JP | 2011-043955 A | 3/2011 |
| JP | 2017-200004 A | 11/2017 |
| JP | 2017-208722 A | 11/2017 |

* cited by examiner

*Primary Examiner* — Harry K Liu
(74) *Attorney, Agent, or Firm* — Muirhead and Saturnelli, LLC

(57) ABSTRACT

It is provided of a system capable of estimating a current position of a terminal apparatus, even if a terminal apparatus for mobile communication is in a condition of non-receiving or inability to receive GNSS signals. A radio relay apparatus, in which a relay station mounted on a drone, transmits radio waves from a directional antenna toward the ground while flying in an upper airspace above a target area on the ground, and transmits position information on its own apparatus obtained based on the GNSS signal, to an information processing apparatus. The terminal apparatus measures a reception power or a reception quality of radio waves transmitted from the radio relay apparatus, and transmits reception measurement information regarding the measurement result of the reception power or the reception quality, to the information processing apparatus. The information processing apparatus estimates the position of the terminal apparatus in the target area, based on the position information from the radio relay apparatus received in a flight time period during which the radio relay apparatus flies in the upper airspace above the target area and the reception measurement information from the terminal apparatus. The information processing apparatus may estimate the position where the reception power or the reception quality from the terminal apparatus is maximum, as the position of the terminal apparatus.

20 Claims, 13 Drawing Sheets

(58) Field of Classification Search
USPC .................................................. 342/357.48
See application file for complete search history.

SYSTEM, RADIO RELAY APPARATUS, INFORMATION PROCESSING APPARATUS AND METHOD FOR SPECIFYING POSITION OF TERMINAL APPARATUS

DESCRIPTION

Technical Field

The present invention relates to a system, a radio relay apparatus, an information processing apparatus and a method for specifying a position of a terminal apparatus.

Background Art

There is conventionally known a system for receiving position information from a terminal apparatus that has acquired position information by receiving radio waves of GNSS (Global Positioning Satellite System) signals such as GPS (Global Positioning System) from artificial satellites.

For example, in Patent Literature 1, a victim-rescue support system is disclosed, which is configured with a victim-rescue support apparatus and a mobile phone possessed by a victim. The mobile phone receives GPS signals from GPS satellites, calculates a position of own mobile phone from the received GPS signals, and transmits the position information to the victim-rescue support apparatus. The victim-rescue support apparatus transmits a radio wave having an instruction signal that instructs a transmission of position information, to the mobile phone, and receives position information transmitted from the mobile phone as a response to the instruction signal.

CITATION LIST

Patent Literature

Patent Literature 1: Japanese Unexamined Patent Publication No. 2011-043955.

SUMMARY OF INVENTION

Technical Problem

In the conventional system, when it is in condition that the terminal apparatus (mobile phone) possessed by the victim is buried deep in snow, soil and sand, etc. and cannot receive GNSS signals (GPS signals), or in condition that a GNSS-signal reception function of the terminal apparatus is set to OFF (each condition is hereinafter referred to as "GNSS non-receiving condition"), there is a problem that the position of the terminal apparatus cannot be specified by receiving the position information from the terminal apparatus.

Solution to Problem

A system according to an aspect of the present invention is a system for specifying a position of a terminal apparatus for mobile communication. This system comprises a terminal apparatus for mobile communication, a radio relay apparatus in which a relay station for relaying radio communication between a fixed base station of a mobile communication network and the terminal apparatus is mounted on a drone, and an information processing apparatus provided in the mobile communication network or another communication network. The radio relay apparatus comprises a directional antenna having directivity in a direction toward a ground, a GNSS reception apparatus for receiving GNSS signals from artificial satellites, and a control apparatus for controlling to transmit radio waves from the directional antenna toward the ground, and transmit position information on the radio relay apparatus obtained based on the GNSS signal received by the GNSS reception apparatus, to the information processing apparatus, while flying in an upper airspace above a target area on the ground. The terminal apparatus comprises a reception measurement section for measuring a reception power or a reception quality of the radio waves transmitted from the radio relay apparatus, and an information transmitting section for transmitting reception measurement information on a measurement result of the reception power or the reception quality, to the information processing apparatus. The information processing apparatus comprises an information receiving section for receiving position information on the radio relay apparatus from the radio relay apparatus and receiving the reception measurement information from the terminal apparatus in a flight time period during which the radio relay apparatus flies in the upper airspace above the target area, and a position estimating section for estimating a position of the terminal apparatus in the target area based on the position information on the radio relay apparatus and the reception measurement information.

A radio relay apparatus according to another aspect of the present invention is a radio relay apparatus in which a relay station that relays radio communication between a fixed base station of a mobile communication network and a terminal apparatus is mounted on a drone. This radio relay apparatus comprises a directional antenna having directivity in a direction toward a ground, a GNSS reception apparatus for receiving GNSS signals from artificial satellites, a communication apparatus for communicating with an information processing apparatus that is provided in the mobile communication network or another communication network and specifies a position of a terminal apparatus for mobile communication, and a control apparatus for controlling to transmit radio waves from the directional antenna toward the ground direction, and transmit position information on the radio relay apparatus obtained based on the GNSS signal received by the GNSS reception apparatus, to the information processing apparatus, while flying in an upper airspace above a target area on the ground.

An information processing apparatus according to yet another aspect of the present invention is an information processing apparatus for specifying a position of a terminal apparatus for mobile communication. This information processing apparatus comprises an information receiving section for receiving position information on a radio relay apparatus obtained based on the GNSS signals received by the GNSS reception apparatus, from the radio relay apparatus, with respect to a flight time period during which the radio relay apparatus, which has a directional antenna with directivity in the ground direction, a GNSS reception apparatus for receiving GNSS signals from artificial satellites and a communication apparatus for communicating with the information processing apparatus, flies in an upper airspace above a target area on the ground, and receiving reception measurement information including a measurement result of the reception power or the reception quality from the terminal apparatus that measures the reception power or the reception quality of radio waves transmitted toward the ground from the directional antenna of the radio relay apparatus, and a position estimating section for estimating the position on the terminal apparatus in the target area based on the position information on the radio relay apparatus and the reception measurement information.

A method according to yet another aspect of the present invention is a method for specifying a position of a terminal apparatus for mobile communication. This method includes flying a radio relay apparatus having a directional antenna with directivity in a direction toward the ground and a GNSS reception apparatus for receiving GNSS signals from artificial satellites in an upper airspace above a target area on the ground, receiving position information on the radio relay apparatus obtained based on the GNSS signals received by the GNSS reception apparatus, from the radio relay apparatus and receiving reception measurement information including a measurement result of the reception power or the reception quality, from the terminal apparatus that measures the reception power or the reception quality of radio waves transmitted from the directional antenna of the radio relay apparatus toward the ground, with respect to a flight time period during which the radio relay apparatus flies in the upper airspace above the target area on the ground, and estimating the position of the terminal apparatus in the target area based on the position information on the radio relay apparatus and the reception measurement information.

The foregoing information processing apparatus may estimate a position at which the reception power or the reception quality of radio waves, which are received by the terminal apparatus from the radio relay apparatus, is maximized, as the position of the terminal apparatus.

The foregoing information processing apparatus may record reception measurement data (x, y, E) combining position information (x, y) obtained by converting the latitude and longitude of the radio relay apparatus corresponding to the same time into a relative distance, and the reception measurement information (E), for each of plural times in the flight time period.

The foregoing information processing apparatus may further comprise an image generating section for generating an image that three-dimensionally displays the reception measurement information (E) in the z-axis direction at the position (x, y) of the radio relay apparatus on a planar map, or an image in which a hue, saturation or brightness at the position (x, y) of the radio relay apparatus on a planar map is changed depending on the reception measurement information (E), based on plural sets of the position information (x, y) and the reception measurement information (E) of the radio relay apparatus, which correspond to plural times in the flight time period.

In the foregoing system, the radio relay apparatus, the information processing apparatus and the method, a first-position estimation process for recording the position information and the reception measurement information and estimating the position of the terminal apparatus by the information processing apparatus by flying the radio relay apparatus, with respect to an entire target area, and a second-position estimation process for recording the position information and the reception measurement information and estimating the position of the terminal apparatus by the information processing apparatus by flying the radio relay apparatus finely, with respect to a range that includes the position of the terminal apparatus estimated in the first-position estimation process and is narrower than the target area may be performed step by step.

The foregoing radio relay apparatus may comprise means for switching a width of the directional beam of the directional antenna in the direction toward the ground.

In the foregoing system, the radio relay apparatus, the information processing apparatus and the method, the radio relay apparatus may be flown so that a vertical distance between the radio relay apparatus and the ground surface of the target area is constant.

When the terminal apparatus cannot receive the GNSS signal or when a function of receiving the GNSS signal is stopped, an application program, which performs processing for transmitting the reception measurement information to the information processing apparatus, may be started.

DESCRIPTION OF EMBODIMENTS

Hereinafter, embodiments of the present invention are described with reference to the drawings.

A system according to embodiments described herein is a system capable of estimating and specifying a position of a mobile terminal based only on GPS position information on a radio relay apparatus mounted on a drone (hereinafter referred to as "drone-radio relay apparatus") and information on a measurement result of reception power or a reception quality of a mobile terminal, in case that a terminal apparatus (hereinafter referred to as "mobile terminal") such as a user apparatus for mobile communication or a mobile station is in a GPS non-receiving condition.

The drone-radio relay apparatus can be stop a flight (hovering) so as to be positioned in an upper airspace above a target area such as, for example, a disaster-occurrence location where a disaster such as a typhoon, an earthquake, etc. has occurred, or a distress-occurrence location where a distress such as an avalanche, etc. has occurred, and can function as a temporary or emergency repeater (slave repeater) or base station (eNodeB) that relays communications between a communication network such as a mobile communication network and the mobile terminals in the target area. As a result, for example, it is possible to quickly restore communications with mobile phones, smartphones, etc. at the disaster-occurrence location, and support a search and rescue of a victim by relaying a communication of a victim's mobile phone, smartphone, etc. at the distress-occurrence location.

In the following embodiments, although a kind of information on the measurement result of the reception power of the mobile terminal is used to estimate a position of a mobile terminal, instead of or in addition to the measurement result of the reception power of the mobile terminal received from the drone-radio relay apparatus, a kind of information on the measurement result of the reception quality of the mobile terminal may be used.

Figure 1:
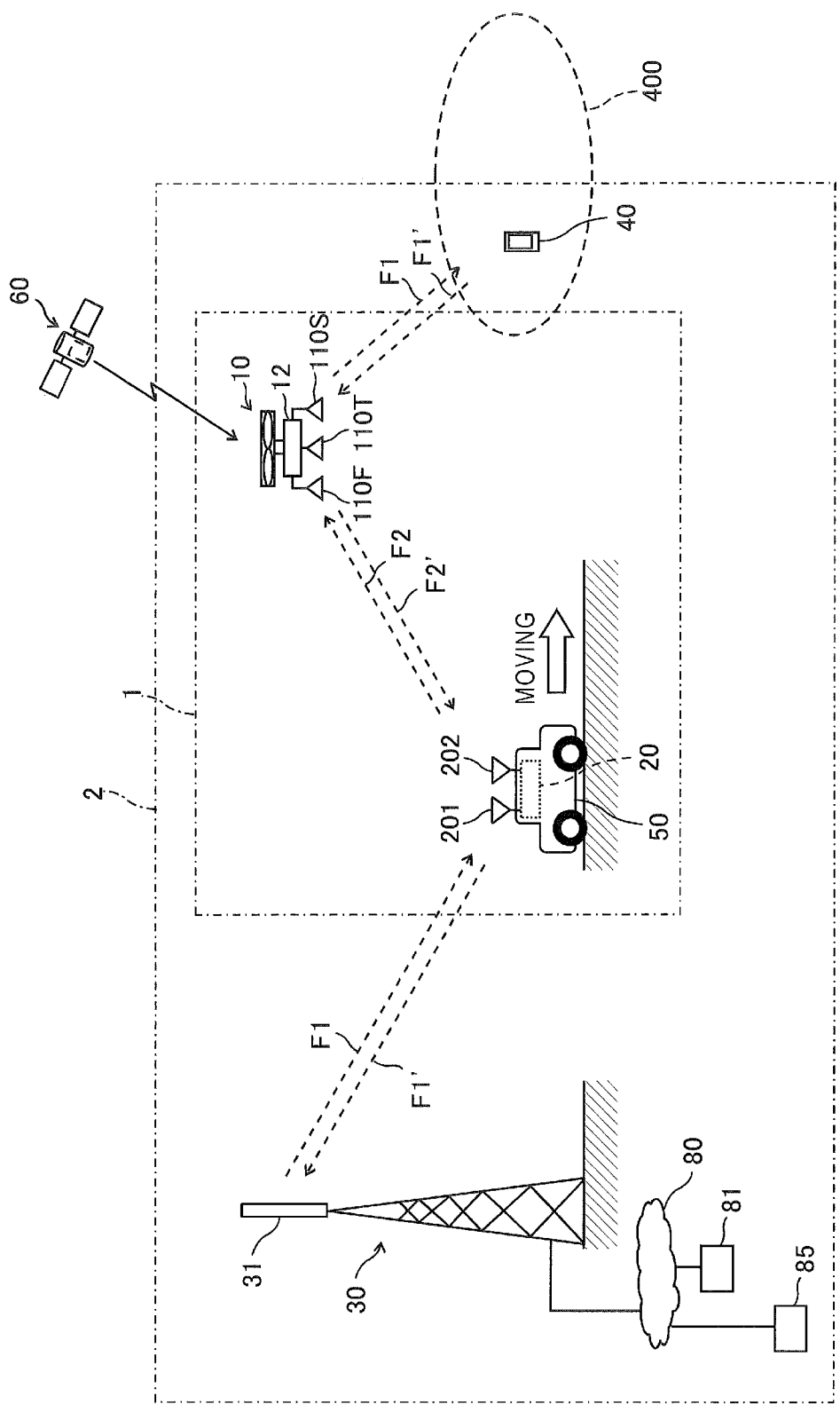
FIG. 1 is an illustration showing an example of a schematic configuration of a terminal-position specifying system using a drone-radio relay system according to an embodiment.

FIG. 1 is an illustration showing an example of a schematic configuration of a terminal-position specifying system 2 using a drone-radio relay system 1 according to an embodiment. The terminal-position specifying system 2 of the present embodiment includes the drone-radio relay system 1, a server 81 as an information processing apparatus that performs an information processing for specifying a terminal position, and a mobile terminal 40 as a terminal apparatus (also referred to as "user apparatus" or "mobile station") whose position is specified and in which a predetermined application program (hereinafter referred to as "search-support application") has been activated. The server 81 is configured with, for example, a single computer apparatus or plural computer apparatuses, and is provided in a mobile communication network 80 or another communication network capable of communicating with the mobile communication network 80.

The terminal-position specifying system 2 may include a console apparatus 85 consisting of a computer apparatus or the like that is operated when an operator accesses the server 81. The console apparatus 85 can communicate with the server 81 via the mobile communication network 80 or another communication network. The console apparatus 85 may be directly connected to the server 81 without going through a communication network.

In FIG. 1, the drone-radio relay system 1 according to the present embodiment is provided with a network-side relay station (hereafter referred to as "master repeater") 20 as a first-radio relay station disposed on the ground or mounted on an automobile (radio relay vehicle) 50 that is a vehicle located on the ground, and a relay station (hereinafter referred to as "slave repeater") 12 as a second radio relay station mounted on a drone-radio relay apparatus 10.

The master repeater 20 and the slave repeater 12 relay a radio communication between a fixed base station 30 such as a macro-cell base station connected to each core network of the mobile communication network 80 of a communication operator (carrier) and a mobile terminal 40 corresponding to the communication operator. By this radio relay, it is possible to temporarily form a cell 400 in an out-of-service area (out of service area) of the cell of the fixed base station 30 and change the out-of-service area to a service area.

The master repeater 20 is a frequency-conversion type radio relay apparatus for relaying radio signals of the first frequencies (relay-target frequencies) F1 (downlink signal) and F1' (uplink signal) to be relayed to and from the fixed base station 30 and radio signals of the second frequencies (intermediate frequencies) F2 (downlink signal) and F2' (uplink signal) to be relayed to and from between the slave repeater 12. The master repeater 20 has a first antenna 201 for the fixed base station 30 and a second antenna 202 for the slave repeater 12.

The drone-radio relay apparatus 10, on which the slave repeater 12 is mounted, is flight-controlled so as to stay in an upper airspace at a predetermined altitude (for example, 100 m to 150 m) from the ground. The drone-radio relay apparatus 10 has a positioning function of receiving radio waves from GPS satellites 60 as GNSS and acquiring position information on its own apparatus. The positioning function of the drone-radio relay apparatus 10 may be performed by receiving radio waves from GNSS artificial satellites other than GPS.

The slave repeater 12 has an antenna for feeder link (hereinafter also referred to as "FL antenna") 110F for the master repeater 20, an antenna for service link (hereinafter also referred to as "SL antenna") 110S for the mobile terminal 40 located in the temporary cell 400, and a narrow-beam directional antenna (hereinafter also referred to as "search antenna") 110T used for a terminal search for estimating the position of the mobile terminal 40 whose position is unknown.

The search antenna 110T is attached to a drone body so as to have directivity toward the ground when the drone-radio relay apparatus 10 is flying while maintaining a basic attitude. The search antenna 110T has a directional beam characteristics with a strong radio-wave intensity in a direction toward the ground, and the beam width of the directional beam is narrower than the beam width of the SL antenna 110S.

It is noted that the SL antenna 110S may also be used as the search antenna 110T. In this case, a control for switching the beam width of the SL antenna 110S of the mobile terminal 40 may be performed so that the beam width is set to be for the service link when relaying the radio communication of the mobile terminal 40, and the beam width is set to be narrower than the beam width for the service link when performing the terminal search for specifying the position of the mobile terminal 40.

The slave repeater 12 is a frequency-conversion type radio relay apparatus for relaying radio signals of the second frequencies (intermediate frequencies) F2/F2' to and from the master repeater 20 and radio signals of the first frequencies (relay-target frequencies) F1/F1' to and from the mobile station 40.

In each of the master repeater 20 and the slave repeater 12, the first frequency (relay target frequency) F1/F1' and the second frequency (intermediate frequency) F2/F2' are frequencies different from each other so as not to occur a loop interference between radio signals transmitted and received by the master repeater 20 and a loop interference between radio signals transmitted and received by the slave repeater 12.

The relay station 12 may have a function of a base station (eNodeB) in addition to the function of the repeater (slave repeater). The drone-radio relay apparatus 10 is provided with a drone-flight control apparatus, a motor-driven propeller, and the like, in addition to the slave repeater 12, the FL antenna 110F, the SL antenna 110S, the search antenna 110T, and the like, which are provided on the drone body frame. The drone-flight control apparatus is provided with, for example, a communication section that receives a flight control signal from the outside, a control section that controls a rotational drive of each propeller by a remote control or an autonomous control, and a power supply section that has a battery or the like.

In the system with the foregoing configuration, when it is in condition that the mobile terminal 40 is buried deep in snow, soil and sand, etc. and cannot receive GPS signals as GNSS signals, or in condition that a GPS-signal reception function of the mobile terminal 40 is set to OFF (each condition is hereinafter referred to as "GPS non-receiving condition"), the position of the mobile terminal 40 cannot be specified by receiving the position information from the mobile terminal 40.

Therefore, in the terminal-position specifying system 2 of the present embodiment, by performing a cooperation among the drone-radio relay system 1, the server 81 and the search support application activated on the mobile terminal 40, the current position of the mobile terminal 40 can be estimated and specified even when the mobile terminal 40 is in the GPS non-receiving condition.

It is noted that the search support application of the mobile terminal 40 may be kept running all the time, or may be automatically started when the mobile terminal 40 became in the GPS non-receiving condition.

Figure 2A:
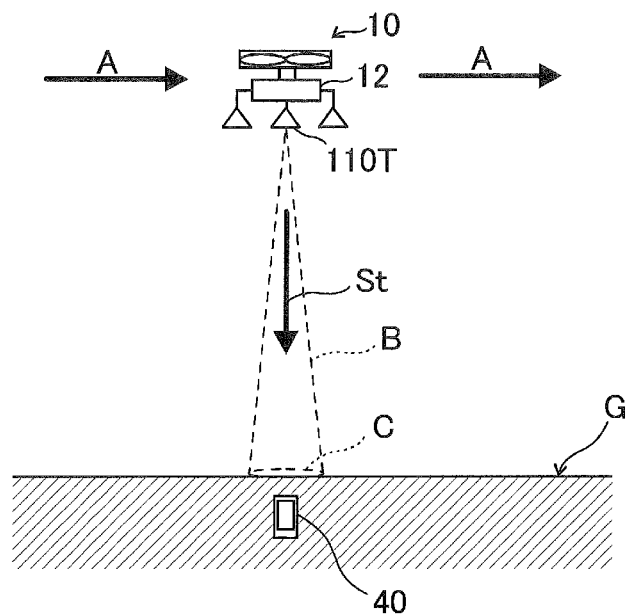
FIG. 2A is an illustration showing a principle of position estimation of a mobile terminal in a terminal-position specifying system according to an embodiment.
Figure 2B:
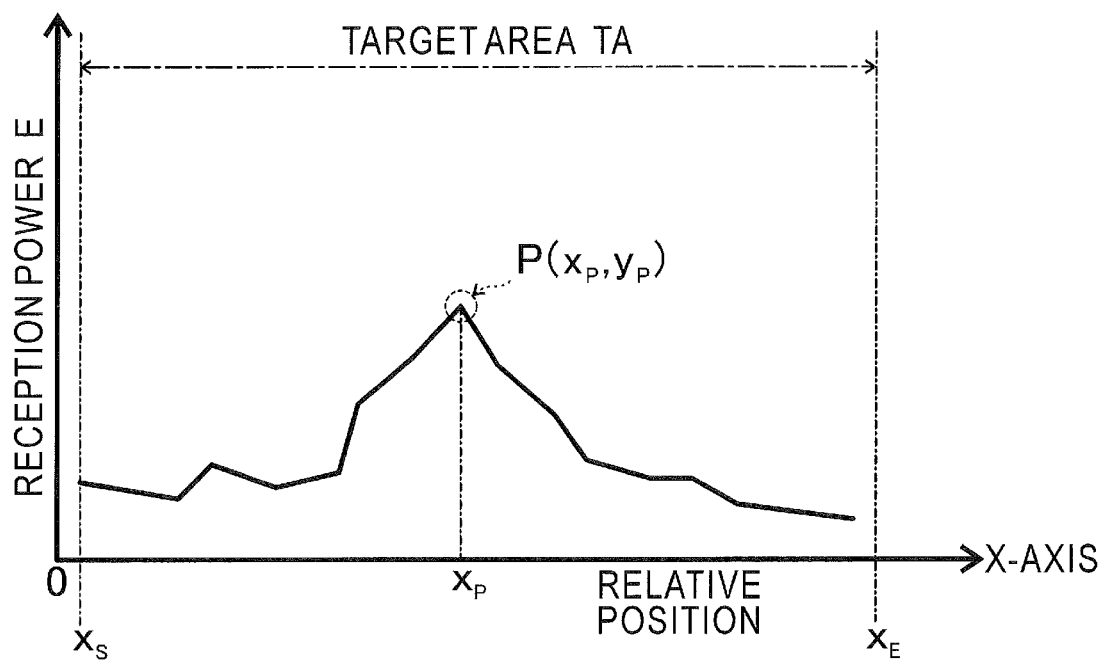
FIG. 2B is an illustration showing a principle of position estimation of a mobile terminal in a terminal-position specifying system according to an embodiment.

FIG. 2A and FIG. 2B are illustrations showing a principle of position estimation of the mobile terminal 40 in the terminal-position specifying system 2 according to the embodiment. FIG. 2A exemplifies a state in which the drone-radio relay apparatus 10 is flying in the horizontal direction of arrow A in the upper air space above the ground G where the mobile terminal 40 is buried in snow, soil and sand, etc. In the illustrated example, the drone-radio relay apparatus 10 transmits a radio wave St with a predetermined beam B in a direction toward the ground from the search antenna 110T in the upper airspace toward the ground G of the target area TA. The radio wave St of the beam B reaches the ground G with a predetermined footprint C size.

FIG. 2B is a graph showing an example of a change in the reception power E measured by the mobile terminal 40 receiving the radio wave St, while the drone-radio relay apparatus 10 flies in one direction (x-axis direction) in the upper airspace above the ground G of the target area TA in which the mobile terminal 40 is buried, and transmits the radio wave St toward the ground.

Since the drone-radio relay apparatus 10 directs the search antenna 110T with the narrow beam directivity toward the ground, an electric field strength of the radio wave St transmitted by the drone-radio relay apparatus 10 is the strongest directly below the drone-radio relay apparatus 10, and the reception power E measured by the mobile terminal 40 is highest when the mobile terminal 40 is positioned directly below the drone-radio relay apparatus 10. When the measured value of the reception power E of the mobile terminal 40 is the highest, the drone-radio relay apparatus 10 is positioned directly above the mobile terminal 40. That is, when the measured value of the reception power E of the mobile terminal 40 is the highest, the position of the mobile terminal 40 and the position $(x_p, y_p)$ of the drone-radio relay apparatus 10 are the same as each other, and the GPS position information measured by the GPS of the drone-radio relay apparatus 10 or a relative distance flight position $(x_p, y_p)$ calculated with reference to the origin of the target area in the orthogonal coordinate system based on the GPS position information can be estimated as the position of the mobile terminal 40.

Figure 3:
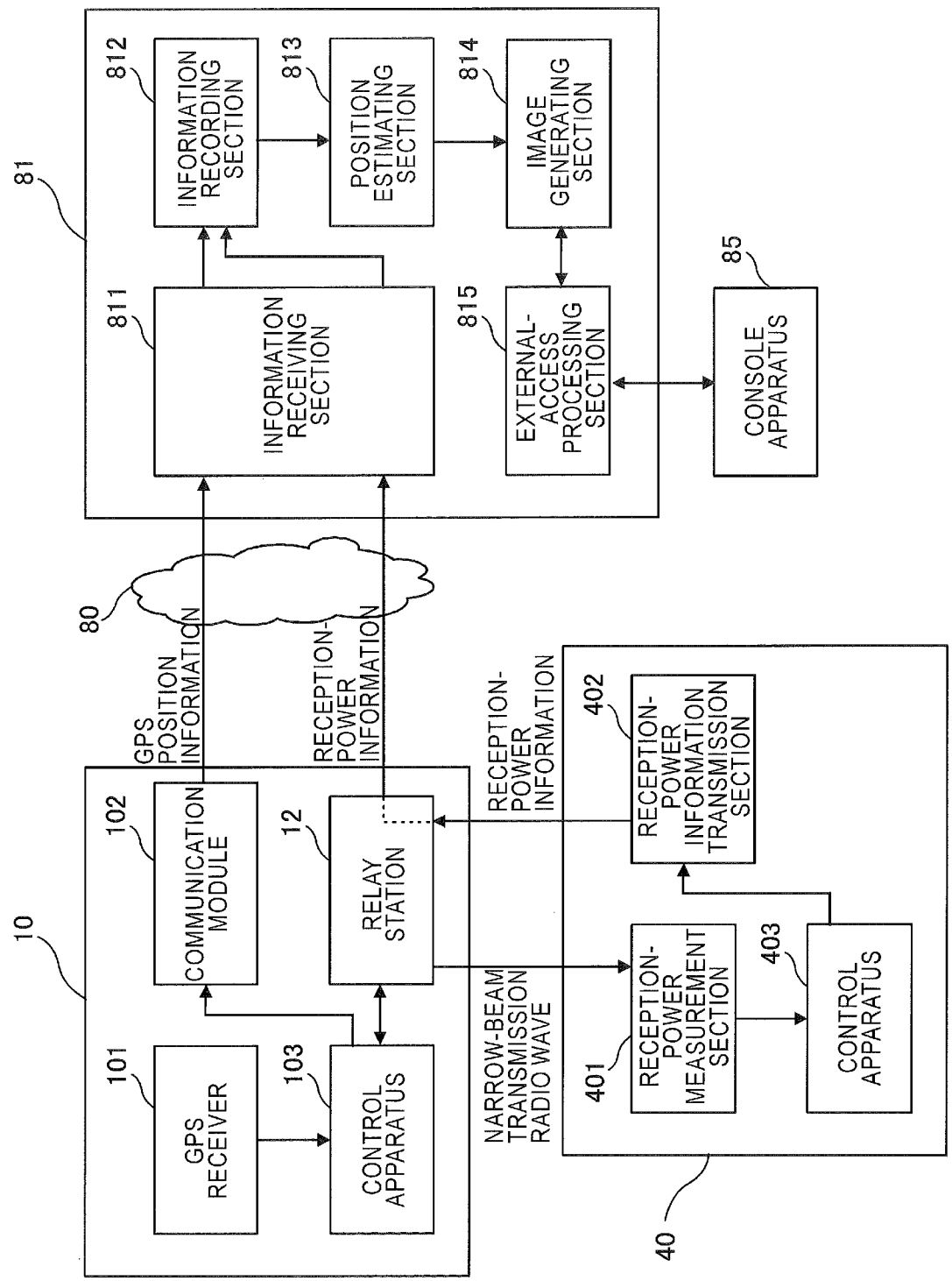
FIG. 3 is a block diagram showing an example of main configurations of a drone-radio relay apparatus, a server and a mobile terminal in a terminal-position specifying system according to an embodiment.

FIG. 3 is a block diagram showing an example of main configurations of the drone-radio relay apparatus 10, the server 81 and the mobile terminal 40 in the terminal-position specifying system 2 according to the embodiment. In FIG. 3, the drone-radio relay apparatus 10 has the relay station (slave repeater) 12 described above, a GPS receiver 101 as a GNSS receiver, a communication module 102 as a communication apparatus, and a control apparatus 103.

The GPS receiver 101 receives radio waves from plural GPS satellites 60 and calculates information on the current position (for example, latitude, longitude and altitude) of the drone-radio relay apparatus 10 as its own apparatus. The communication module 102 is, for example, a mobile communication module having a function of a mobile terminal (user apparatus, mobile station), which is a terminal apparatus of mobile communication, and can communicate with the server 81 via the mobile communication network 80.

The control apparatus 103 is configured with, for example, a processor such as a CPU, a memory, etc., and performs a data processing and controls each section by executing a control program composed of predetermined program codes, which is preinstalled or downloaded via the communication network. In the present embodiment, while flying in the upper airspace above the target area TA over the entire target area TA on the ground, the control apparatus 103 controls so as to transmit the radio wave St from the search antenna 110T toward the ground G, and transmit the position information (for example, latitude and longitude) on the drone-radio relay apparatus 10, which is obtained based on the GPS signal as the GNSS signal received by the GPS receiver 101, to the server 81.

In addition to having a normal configuration as a terminal apparatus (mobile terminal, user apparatus, mobile station) of a mobile communication system, the mobile terminal 40 has a reception-power measurement section 401 as a reception-power measurement section, a reception-power information transmission section 402 as a reception-measurement information transmission section, and a control apparatus 403.

The reception-power measurement section 401 measures the reception power E of the narrow-beam transmission radio wave St transmitted from the drone-radio relay apparatus 10. The reception-power information transmission section 402 transmits reception power information including the measurement result of the reception power E, to the server 81 via the slave repeater 12 of the drone-radio relay apparatus 10 and the mobile communication network 80. The reception power information may be transmitted to the server 81 via the fixed base station 30 and the mobile communication network 80.

The control apparatus 103 is configured with, for example, a processor such as a CPU, a memory, etc., and performs a data processing and controls each section by executing a search-support application program composed of predetermined program codes, which is preinstalled or downloaded via the communication network. In the present embodiment, the control apparatus 403 controls to transmit the reception power information including the measurement result of the reception power E measured by the reception-power measurement section 401, to the server 81, in response to an information request from the server 81, or autonomously at a predetermined timing.

The server 81 is configured with, for example, one or more computer apparatuses, and is provided with an information receiving section 811, an information recording section 812, a position estimating section 813, an image generating section 814, and an external-access processing section 815.

The information receiving section 811 receives GPS position information on the drone-radio relay apparatus 10 from the drone-radio relay apparatus 10, with respect to a flight time period during which the drone-radio relay apparatus 10 flies in the upper airspace above the target area TA, and receives reception power information as reception measurement information from the mobile terminal 40.

The information recording section 812 records, with respect to the foregoing flight time period, each of the position information on the drone-radio relay apparatus 10 and the reception power information on the mobile terminal 40, and the corresponding time information, in association with each other.

The time information is, for example, the reception time (time stamp) when the server 81 receives each piece of information. As the time information, the time information (time stamp) when the drone-radio relay apparatus 10 obtains the GPS position information may be received and recorded, or the time information (time stamp) when the mobile terminal 40 measures the reception power may be received from the mobile terminal 40 and recorded.

The position information on the drone-radio relay apparatus 10 recorded in the information recording section 812 may be GPS position information on the drone-radio relay apparatus 10, or may be relative distance position information (x, y) with reference to the origin in the orthogonal coordinate system defined in the target area TA, which is calculated based on the GPS position information. The information recorded in the information recording section 812 may be reception power data (x, y, E) as reception measurement data that is a combination of the position information (x, y) of the drone-radio relay apparatus 10 and the reception measurement information (E) corresponding to the same time, for each of the plural times in the foregoing flight time period.

The position estimating section 813 estimates the position of the mobile terminal 40 in the target area TA based on the position information, reception power information and time information on the drone-radio relay apparatus 10. For example, the position estimating section 813 detects the position $(x_p, y_p)$ of the drone-radio relay apparatus 10 at which the reception power E is maximized, based on plural sets of reception power data (x, y, E) corresponding to plural times in the foregoing flight time period, and estimates the position $(x_p, y_p)$ of the drone-radio relay apparatus 10 as the position of the mobile terminal 40.

The image generating section 814 generates a map image that three-dimensionally displays the reception power (E) in the z-axis direction at the position (x, y) of the drone-radio relay apparatuses 10 on the planar map, based on plural sets of the position information (x, y) and reception power (E) of the drone-radio relay apparatuses 10 corresponding to plural times in the foregoing flight time period. The image generated by the image generating section 814 may be a map image in which the hue, saturation or brightness of the position (x, y) of the drone-radio relay apparatus 10 on the planar map is changed depending on the reception power (E).

The external-access processing section 815 performs a process of accessing to the server 81 from the external console apparatus 85 operated by the operator. By operating the console apparatus 85, the operator can request a search for the mobile terminal 40, and receive from the server 81 and display an image of a planar map including an indication of the position of the mobile terminal 40.

Figure 4:
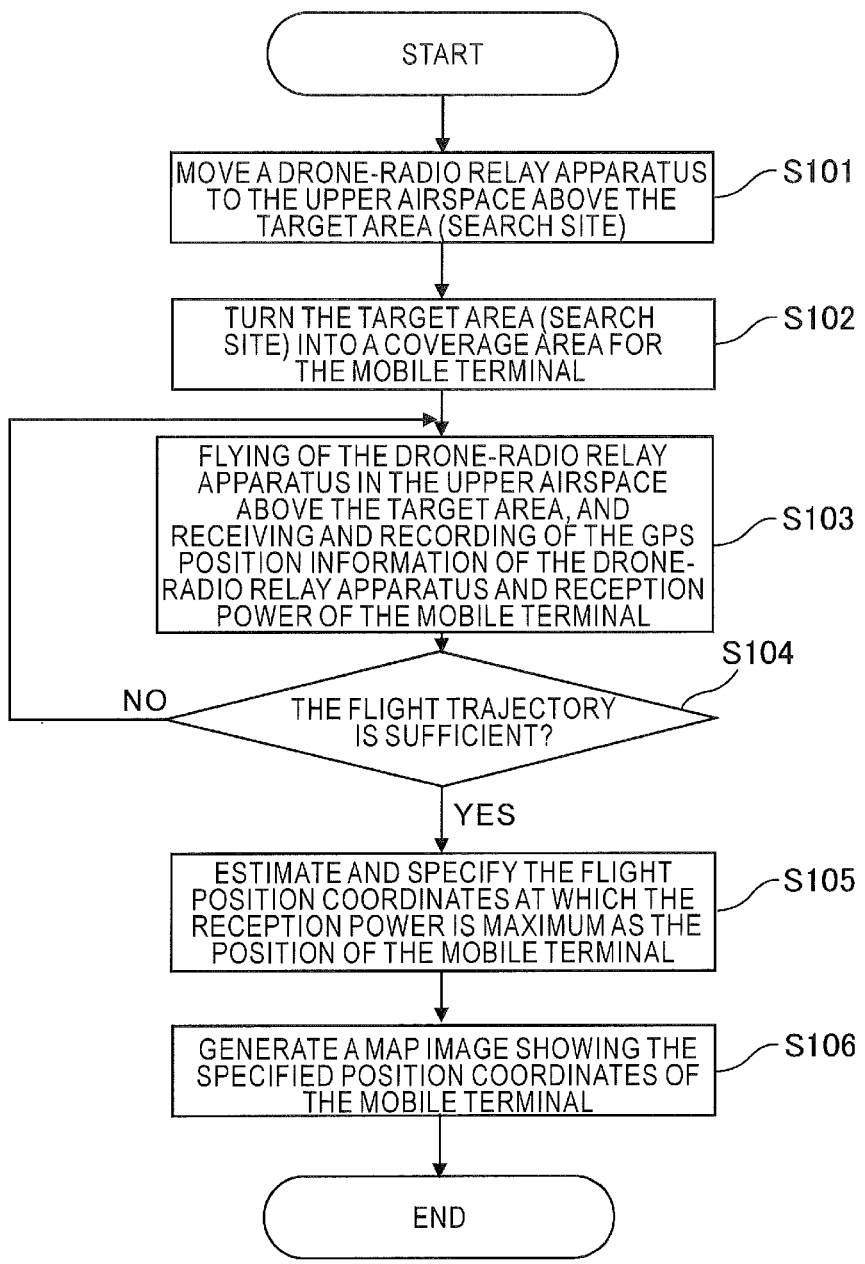
FIG. 4 is a flowchart showing an example of a position estimation process of a mobile terminal in a terminal-position specifying system according to an embodiment.
Figure 5A:
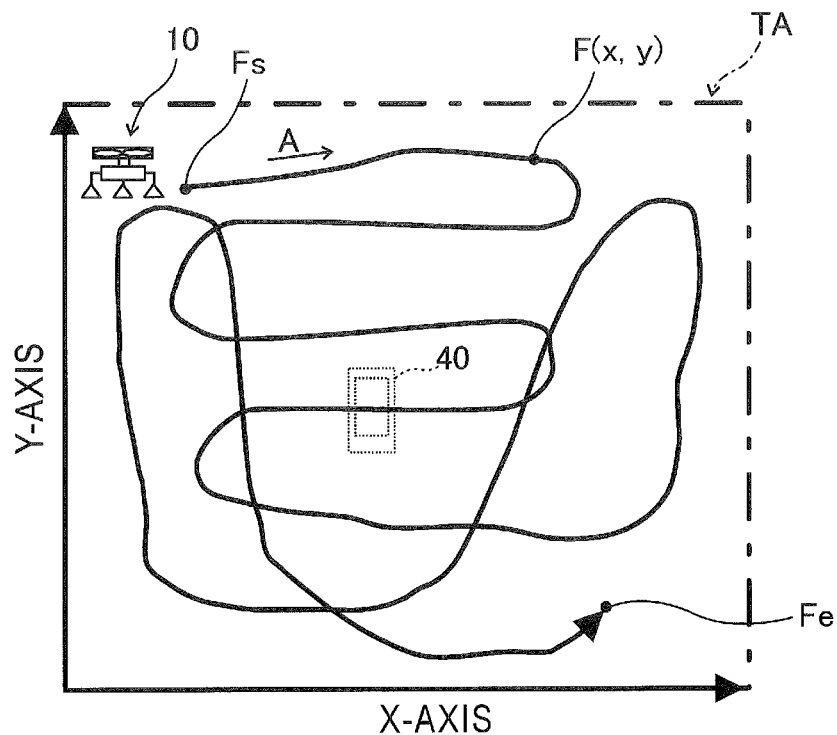
FIG. 5A is an illustration showing an example of a flight trajectory in an upper airspace above a target area of a drone-radio relay apparatus in the position estimation process of FIG. 4.
Figure 5B:
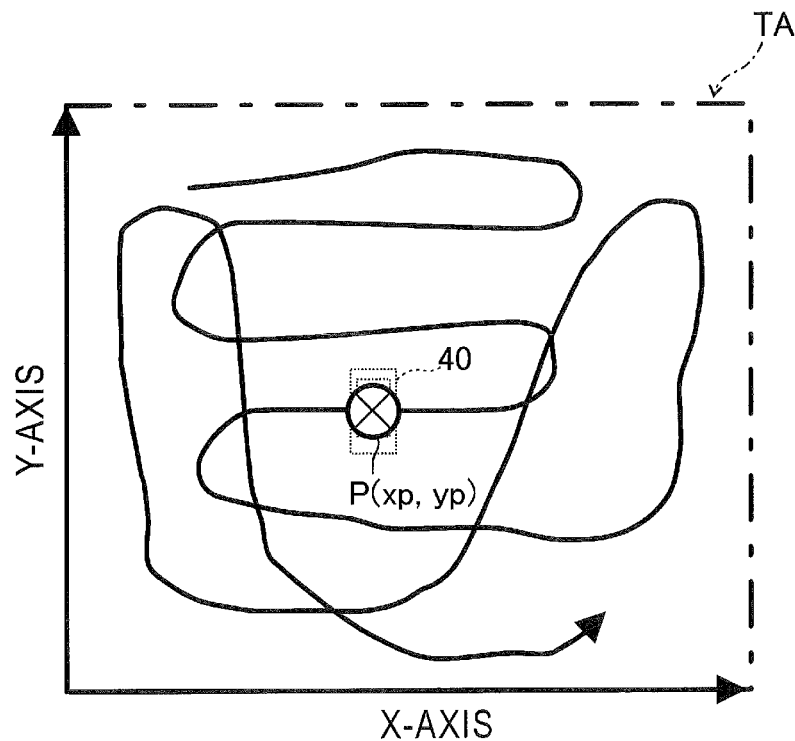
FIG. 5B is an illustration showing an example of the estimated position of the mobile terminal 40 in the target area which is estimated by the position estimation process of FIG. 4.

FIG. 4 is a flowchart showing an example of a position estimation process of the mobile terminal 40 in the terminal-position specifying system 2 according to the embodiment. FIG. 5A is an illustration showing an example of a flight path F (x, y) in the upper airspace above the target area TA of the drone-radio relay apparatus 10 in the position estimation process of FIG. 4, and FIG. 5B is an illustration showing an example of the estimated position P $(x_p, y_p)$ of the mobile terminal 40 in the target area which is estimated by the position estimation process of FIG. 4.

In FIG. 4, first, the drone-radio relay apparatus 10 is moved to the upper airspace above the target area TA of the search site, and the target area TA is made into the service area for the mobile terminal 40 (S101, S102).

Next, the drone-radio relay apparatus 10 flies throughout the upper airspace above the target area TA over the entire target area TA of the search site, transmits the radio wave St to the ground from the search antenna 110T and also transmits the GPS position information on its own apparatus 10 to the server 81. The mobile terminal 40 transmits the information on the measurement result of the reception power E of the radio waves received from the drone-radio relay apparatus 10, to the server 81. During the flight of the drone-radio relay apparatus 10, the server 81 stores each of the GPS position information from the drone-radio relay apparatus 10 and the information on the measurement result of the reception power E from the mobile terminal 40, in association with the time information (S103).

The drone-radio relay apparatus 10 repeats the transmission of the radio wave St to the ground and the transmission of the GPS position information on its own apparatus 10 to the server 81, until it flies on a flight trajectory sufficient for estimating the position of the mobile terminal 40 over the entire target area TA, and the mobile terminal 40 repeats the transmission of the information on the measurement result of the reception power E to the server 81 (S103, S104). If the altitude of the ground surface of the target area TA is changing, the drone-radio relay apparatus 10 may be flown while moving up and down so that the vertical distance between the drone-radio relay apparatus 10 and the ground surface of the target area TA is constant.

Next, when the flight trajectory of the mobile terminal 40 in the target area TA becomes a sufficient flight trajectory for position estimation (flight trajectory from the flight position Fs to the flight position Fe in FIG. 5A), the server 81 estimates and specifies the flight position coordinate P ($x_p$, $y_p$) at which the reception power E is maximum as the position of the mobile terminal 40 as shown in FIG. 5B, based on the reception power data (x, y, E) in the flight time period from the flight position Fs to the flight position Fe (S105).

Next, the server 81 generates a map image displaying the specified position coordinate P ($x_p$, $y_p$) of the mobile terminal 40 (S106). The map image generated by the server 81 can be accessed and displayed from the operator's console apparatus 85.

Figure 6:
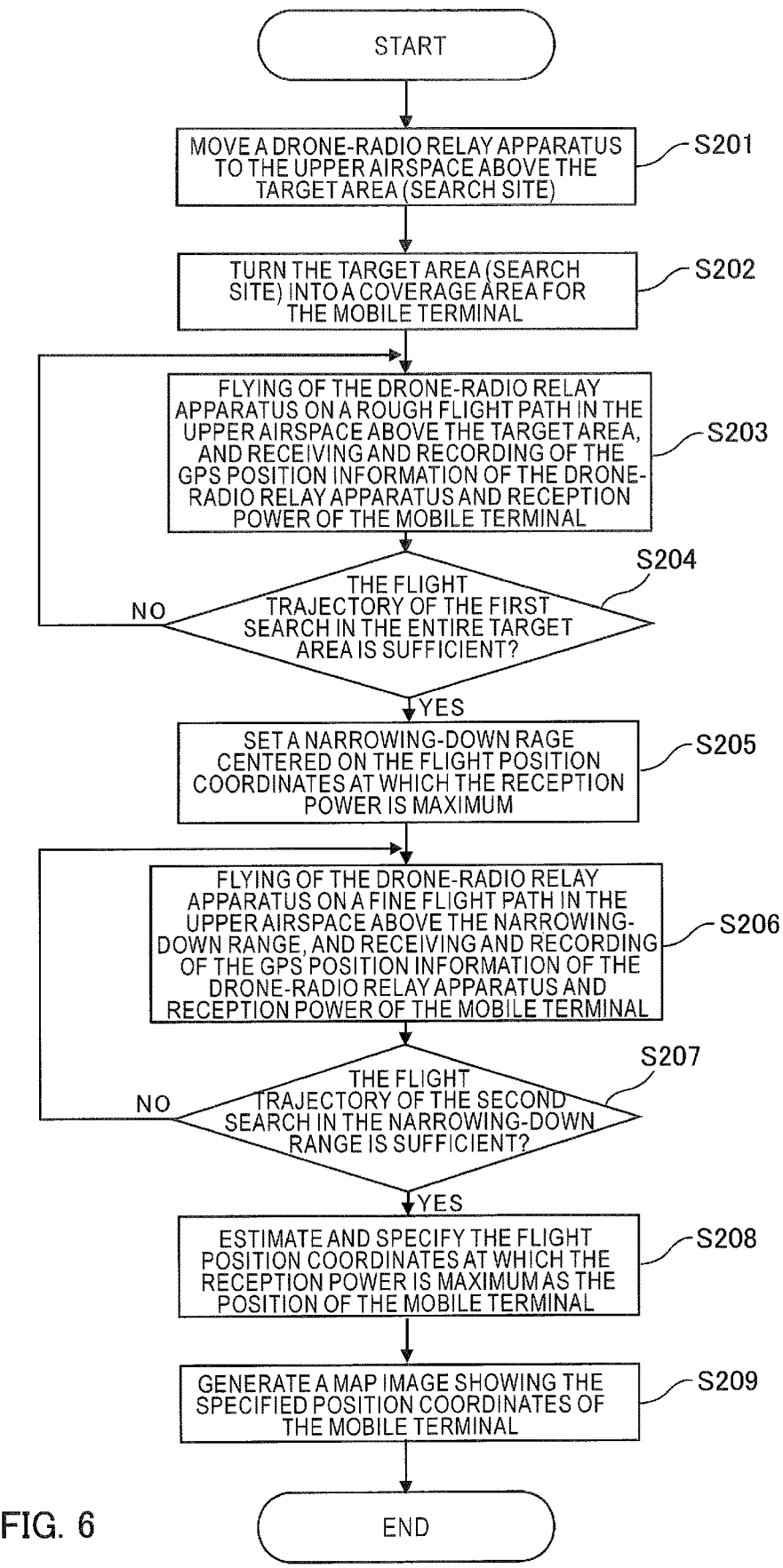
FIG. 6 is a flowchart showing another example of a position estimation process of a mobile terminal in a terminal-position specifying system according to an embodiment.
Figure 7A:
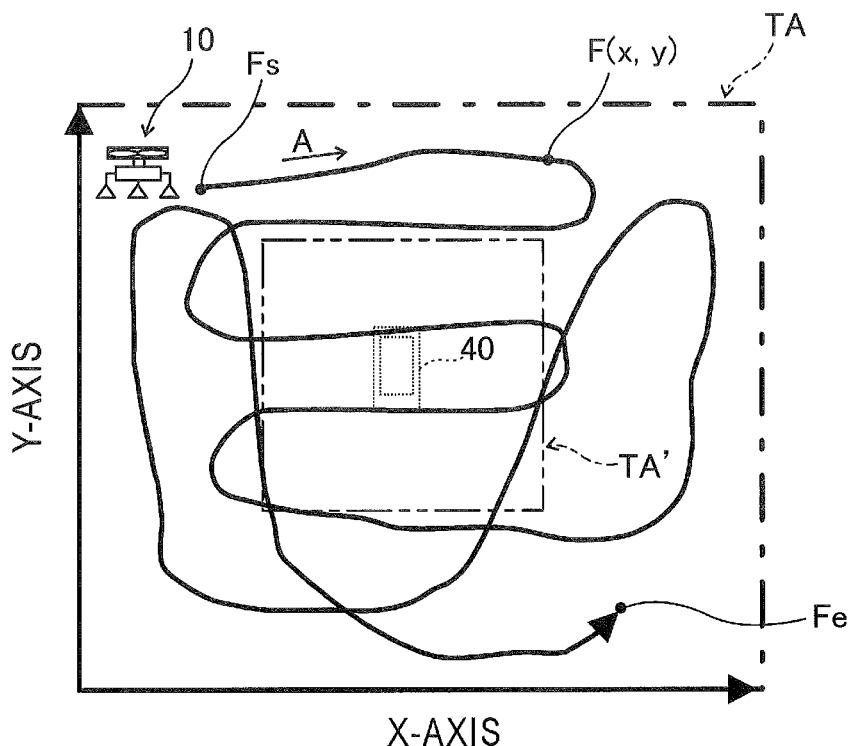
FIG. 7A is an illustration showing an example of a flight trajectory in an upper airspace above a target area of a drone-radio relay apparatus in the position estimation process of the first search stage of FIG. 6.
Figure 7B:
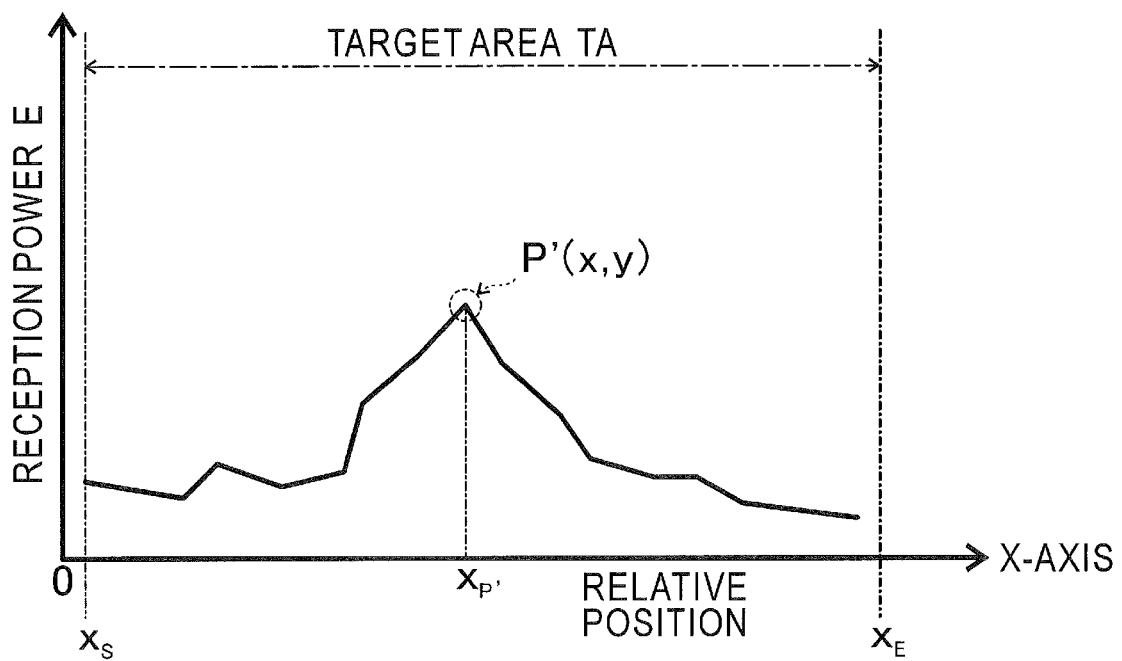
FIG. 7B is an illustration showing an example of a reception power change in an x-axis direction of a drone-radio relay apparatus in the position estimation process of the first search stage of FIG. 6.
Figure 8A:
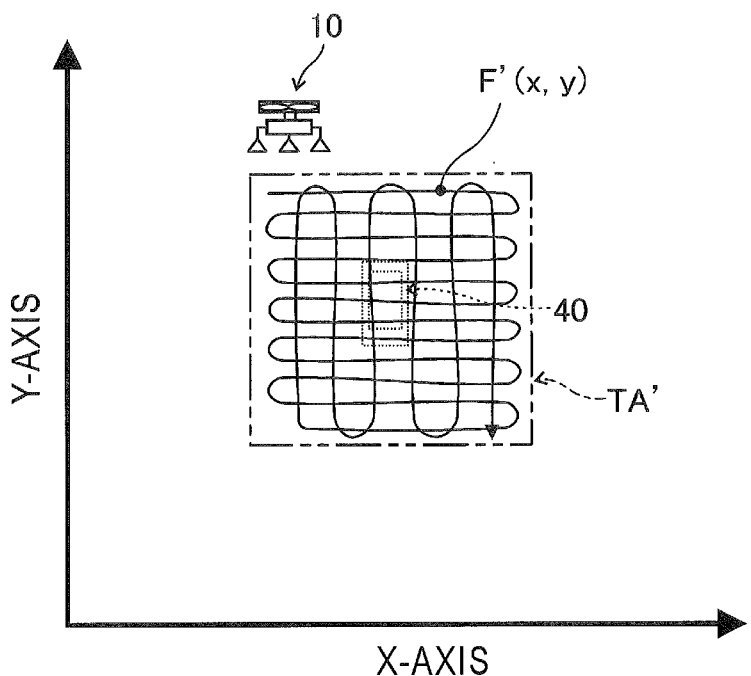
FIG. 8A is an illustration showing an example of a flight trajectory in an upper airspace above a narrowing-down range of a drone-radio relay apparatus in the position estimation process of the second search stage of FIG. 6.
Figure 8B:
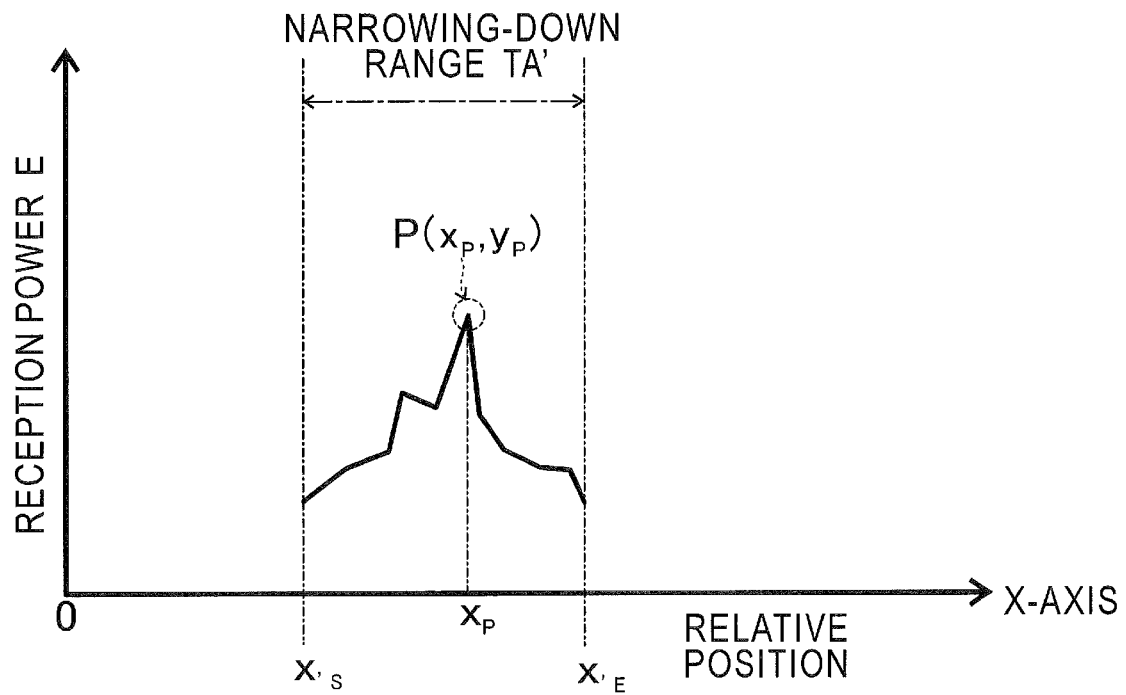
FIG. 8B is an illustration showing an example of a reception power change in an x-axis direction of a drone-radio relay apparatus in the position estimation process of the second search stage of FIG. 6.

FIG. 6 is a flowchart showing another example of a position estimation process of the mobile terminal 40 in the terminal-position specifying system 2 according to the embodiment. Each of FIG. 7A and FIG. 7B is an illustration showing an example of the flight path F (x, y) in the upper airspace above the target area TA of the drone-radio relay apparatus 10 and the change of the reception power E in the x-axis direction, in the position estimation process of the first search stage of FIG. 6. Each of FIG. 8A and FIG. 8B is an illustration showing an example of a flight trajectory F' (x, y) in an upper airspace above a narrowing-down range TA' of the drone-radio relay apparatus 10 and the change of the reception power E in the x-axis direction, in the position estimation process of the second search stage in FIG. 6.

In the examples of FIG. 6, FIG. 7A, FIG. 7B, FIG. 8A and FIG. 8B, by specifying the position of the mobile terminal 40 by the two-stage search, it is possible to efficiently specify the position of the mobile terminal 40 even if the target area TA is wide.

In FIG. 6, first, the drone-radio relay apparatus 10 is moved to the upper airspace above the target area TA of the search site, and the target area TA is made into the service area for the mobile terminal 40 (S201, S202).

Next, in the first search stage for performing the first-position estimation process, the drone-radio relay apparatus 10 flies along a rough flight path F (x, y) in the upper airspace above the target area TA over the entire target area TA of the search site, transmits the radio wave St from the search antenna 110T to the ground and also transmits the GPS position information on its own apparatus 10 to the server 81. The mobile terminal 40 transmits the information on the measurement result of the reception power E of the radio waves received from the drone-radio relay apparatus 10 to the server 81. During the flight along the rough flight path of the drone-radio relay apparatus 10, the server 81 stores each of the GPS position information from the drone-radio relay apparatus 10 and the information on the measurement result of the reception power E from the mobile terminal 40, in association with the time information (S203).

The drone-radio relay apparatus 10 repeats the transmission of the radio wave St to the ground and transmission of the GPS position information on its own apparatus 10 to the server 81, until it flies on a flight trajectory sufficient for estimating the position of the mobile terminal 40 over the entire target area TA, and the mobile terminal 40 repeats the transmission of the information on the measurement result of the reception power E to the server 81 (S203, S204). If the altitude of the ground surface of the target area TA is changing, the drone-radio relay apparatus 10 may be flown while moving up and down so that the vertical distance between the drone-radio relay apparatus 10 and the ground surface of the target area TA is constant.

Next, when the flight trajectory of the mobile terminal 40 in the target area TA becomes a sufficient flight trajectory for narrowing down the search range (flight trajectory from the flight position Fs to the flight position Fe in FIG. 7A), the server 81 assumes that the position of the mobile terminal 40 is the flight position coordinate P' ($x_p$, $y_p$) at which the reception power E is maximized as shown in FIG. 7B, based on the reception power data (x, y, E) in the flight time period from the flight position Fs to the flight position Fe, and sets a narrowing-down range TA' centered on that position (S205).

Next, in the second search stage for performing the second-position estimation process, the drone-radio relay apparatus 10 flies along a fine flight path F' (x, y) in the upper airspace above the narrowing-down range TA' over the entire narrowing-down range TA', transmits the radio wave St from the search antenna 110T to the ground and also transmits the GPS position information on its own apparatus 10 to the server 81. The mobile terminal 40 transmits the information on the measurement result of the reception power E of the radio waves received from the drone-radio relay apparatus 10 to the server 81. During the flight along the detailed flight path of the drone-radio relay apparatus 10, the server 81 stores each of the GPS position information from the drone-radio relay apparatus 10 and the information on the measurement result of the reception power E from the mobile terminal 40, in association with the time information (S206).

The drone-radio relay apparatus 10 repeats the transmission of the radio wave St to the ground and transmission of the GPS position information on its own apparatus 10 to the server 81, until it flies on a flight trajectory sufficient for estimating the position of the mobile terminal 40 over the entire narrowing-down range TA', and the mobile terminal 40 repeats the transmission of the information on the measurement result of the reception power E to the server 81 (S206, S207). If the altitude of the ground surface of the narrowing-down range TA' is changing, the drone-radio relay apparatus 10 may be flown while moving up and down so that the vertical distance between the drone-radio relay apparatus 10 and the ground surface of the narrowing-down range TA' is constant.

Next, when the flight trajectory of the mobile terminal 40 in the target area TA becomes a sufficient flight trajectory for position estimation (see FIG. 8A), the server 81 estimates and specifies the flight position coordinate P ($x_p$, $y_p$) at which the reception power E is maximum as the position of the mobile terminal 40 as shown in FIG. 8B, based on the reception power data (x, y, E) in the flight time period (S208).

Next, the server 81 generates a map image displaying the specified position coordinate P ($x_p$, $y_p$) of the mobile terminal 40 (S209). The map image generated by the server 81 can be accessed and displayed from the operator's console apparatus 85.

In the terminal-position specifying system with the above configuration, when radio waves for exploration are transmitted from the drone-radio relay apparatus 10, the more power is concentrated in a narrow beam in the ground direction, the narrower the beam width (beam footprint size) on the ground, which improves the position estimation accuracy. The fineness of searching of the terminal position depends on the beam width of the directional beam of the search antenna 110T. The narrower the beam width, the narrower the search range at one time, resulting in a longer search time for searching the same area.

Therefore, in the terminal-position specifying system of the present embodiment, in order to transmit radio waves with plural kinds of narrow beams (for example, a first narrow beam B1 with a relatively wide beam width and a second narrow beam B2 with a narrower beam width) with beam widths different from each other, the position estimation accuracy may be improved in a short time, by configuring the search antenna 110T so as to be able to switch between the plural kinds of beams, first performing a wide-area search with the first narrow beam B1, and then switching to the second narrow beam B2 to perform a precise search.

Figure 9A:
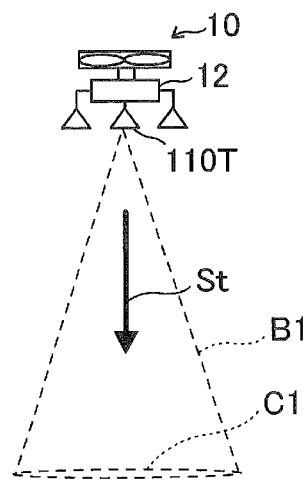
FIG. 9A is an illustration showing an example of a first narrow beam with a relatively wide beam width used for searching on a rough flight path.
Figure 9B:
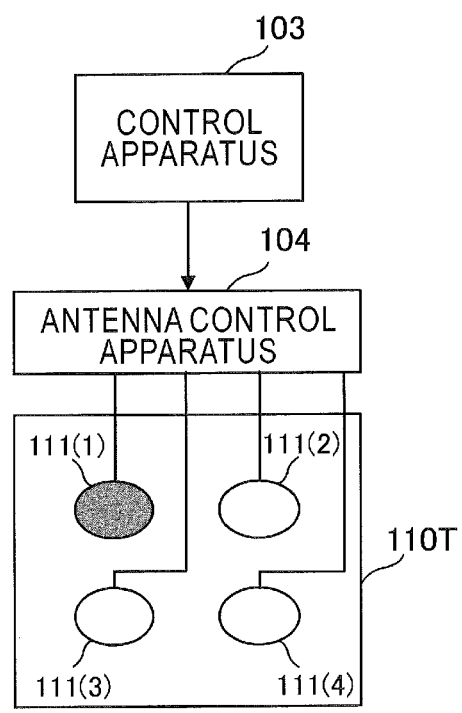
FIG. 9B is an illustration showing an example of a state of a drive control of antenna elements of a search antenna used for searching on a rough flight path.
Figure 10A:
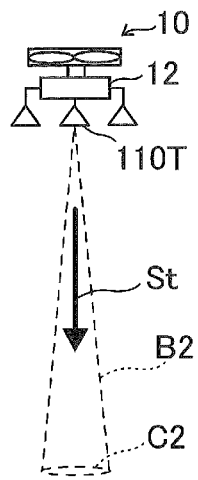
FIG. 10A is an illustration showing an example of a second narrow beam with a narrower beam width used for searching on a fine-grained flight path.
Figure 10B:
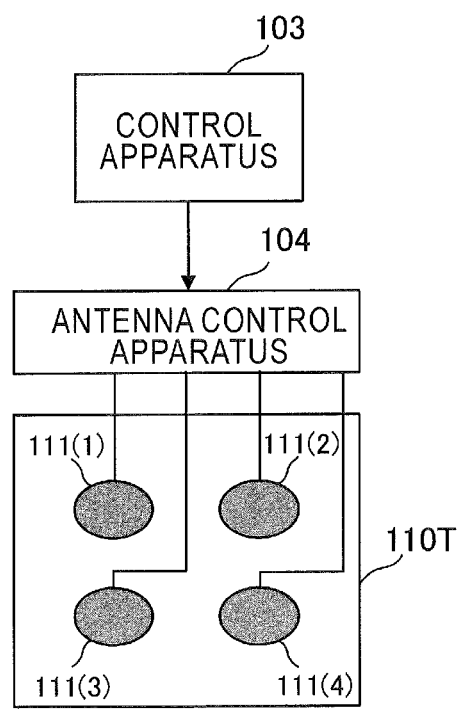
FIG. 10B is an illustration showing an example of a state of a drive control of antenna elements of a search antenna used for searching on a fine-grained flight path.

Each of FIG. 9A and FIG. 9B is an illustration showing an example of a state of drive control of the first narrow beam B1 with a relatively wide beam width used for searching on a rough flight path and the antenna elements of the search antenna 110T. Each of FIG. 10A and FIG. 10B is an illustration showing an example of a state of drive control of the second narrow beam B2 with a narrower beam width used for searching on a fine flight path and the antenna elements of the search antenna 110T. Although the examples of FIG. 9A, FIG. 9B, FIG. 10A and FIG. 10B show examples of using array antennas in which plural antenna elements (in the illustrated example, patch antennas 111(1) to 111(4), which are four planar antennas capable of individually controlling electric current supply) are two-dimensionally disposed, a search antenna having another structure may be used as long as it can be controlled to switch between plural narrow beams having beam widths different from each other.

When transmitting the radio wave St of the first narrow beam B1 with a relatively wide beam width (footprint size C1) on the ground from the slave repeater 12 of the drone-radio relay apparatus 10 as shown in FIG. 9A, the control apparatus 103 controls the antenna control apparatus 104 to supply electric current to only one patch antenna 111(1) of the plural patch antennas 111(1) to 111(4) of the search antenna 110T to activate it as shown in FIG. 9B. As a result, the directional beam directed toward the ground from the search antenna 110T can be made the first narrow beam B1 for wide area search with a relatively wide beam width on the ground.

On the other hand, when transmitting the radio wave St of the second narrow beam B2 with a narrower beam width (footprint size C1) on the ground from the slave repeater 12 of the drone-radio relay apparatus 10 as shown in FIG. 10A, the control apparatus 103 controls the antenna control apparatus 104 to supply all of the plural patch antennas 111(1) to 111(4) of the search antenna 110T with an electric current which is adjusted to predetermined amplitude and phase to activate them as shown in FIG. 10B. As a result, the directional beam directed to the ground from the search antenna 110T can be made the second narrow beam B2 with a narrower beam width on the ground.

Figure 11:
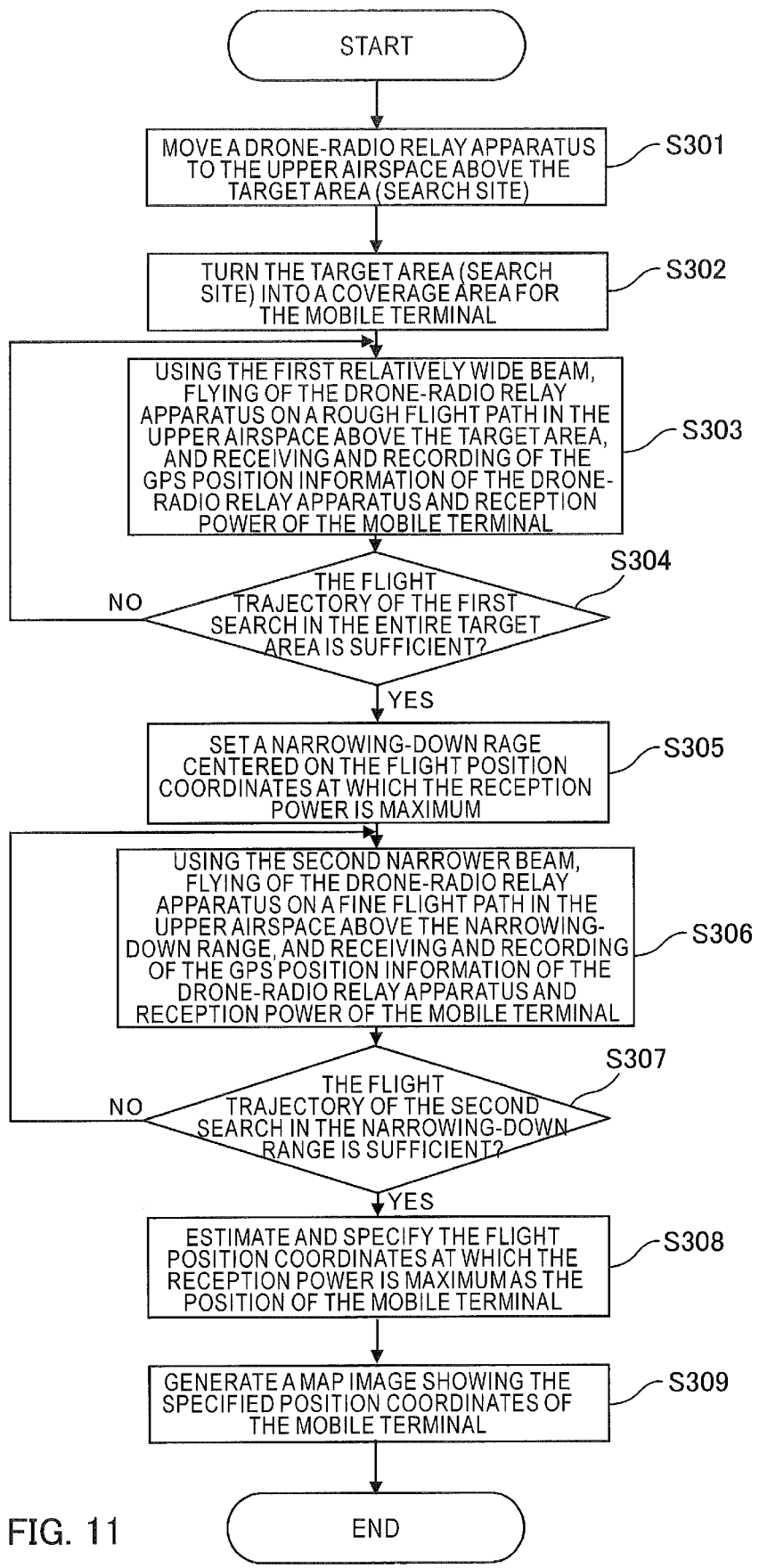
FIG. 11 is a flowchart showing yet another example of a position estimation process of mobile terminal that involves beam switching in a terminal-position specifying system according to an embodiment.
Figure 12A:
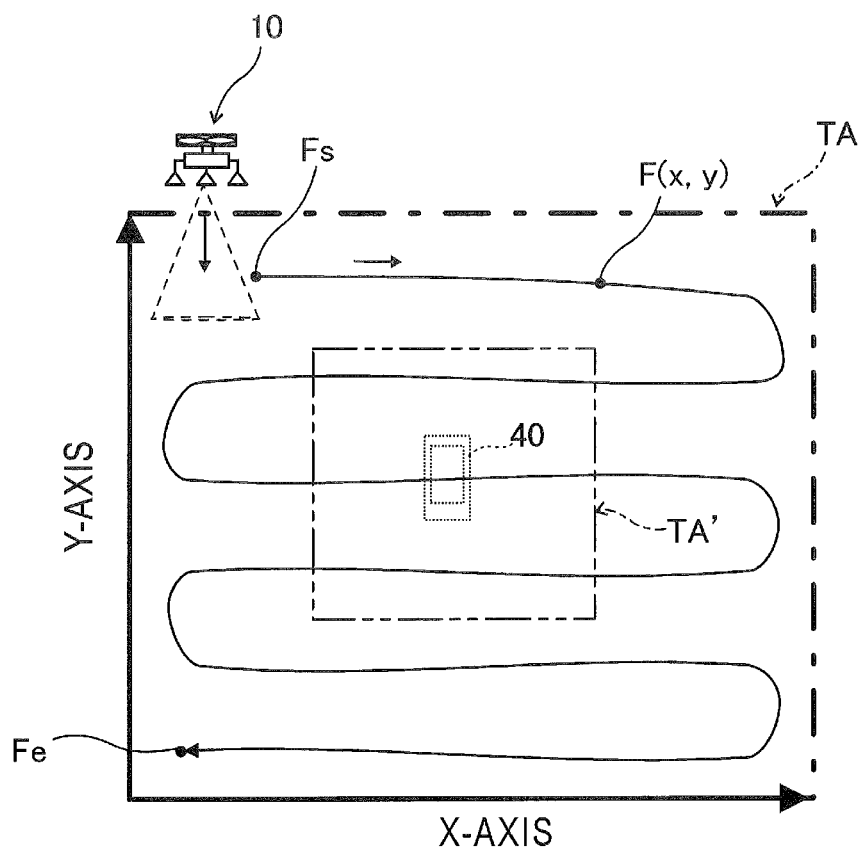
FIG. 12A is an illustration showing an example of a flight trajectory in an upper airspace above a target area of a drone-radio relay apparatus in the position estimation process of the first search stage of FIG. 11.
Figure 12B:
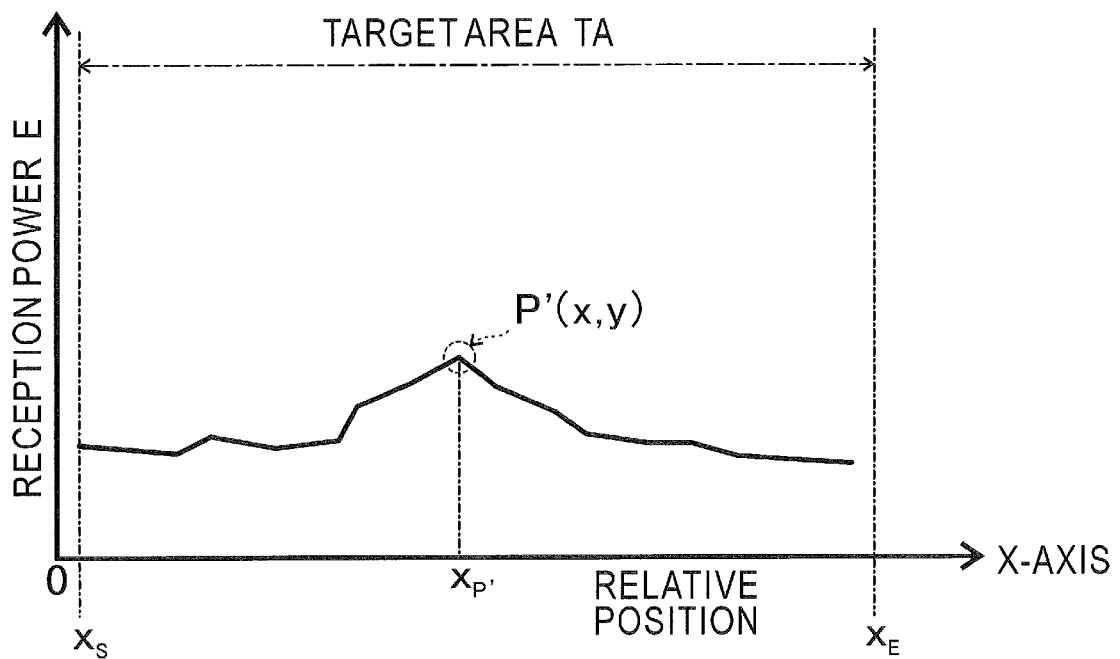
FIG. 12B is an illustration showing an example of a reception power change in an x-axis direction of a drone-radio relay apparatus in the position estimation process of the first search stage of FIG. 11.
Figure 13A:
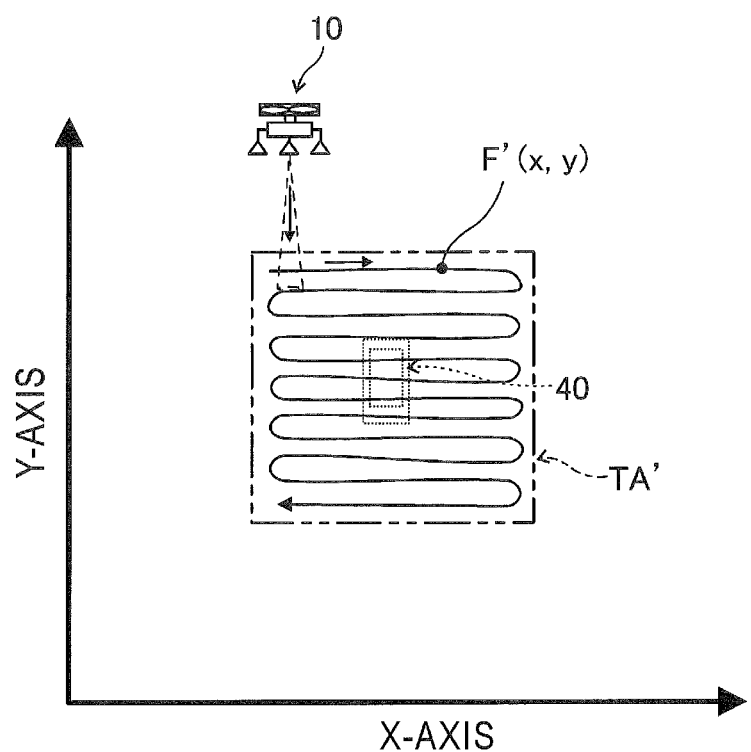
FIG. 13A is an illustration showing an example of a flight trajectory in an upper airspace above a narrowing-down range of a drone-radio relay apparatus in the position estimation process of the second search stage of FIG. 11.
Figure 13B:
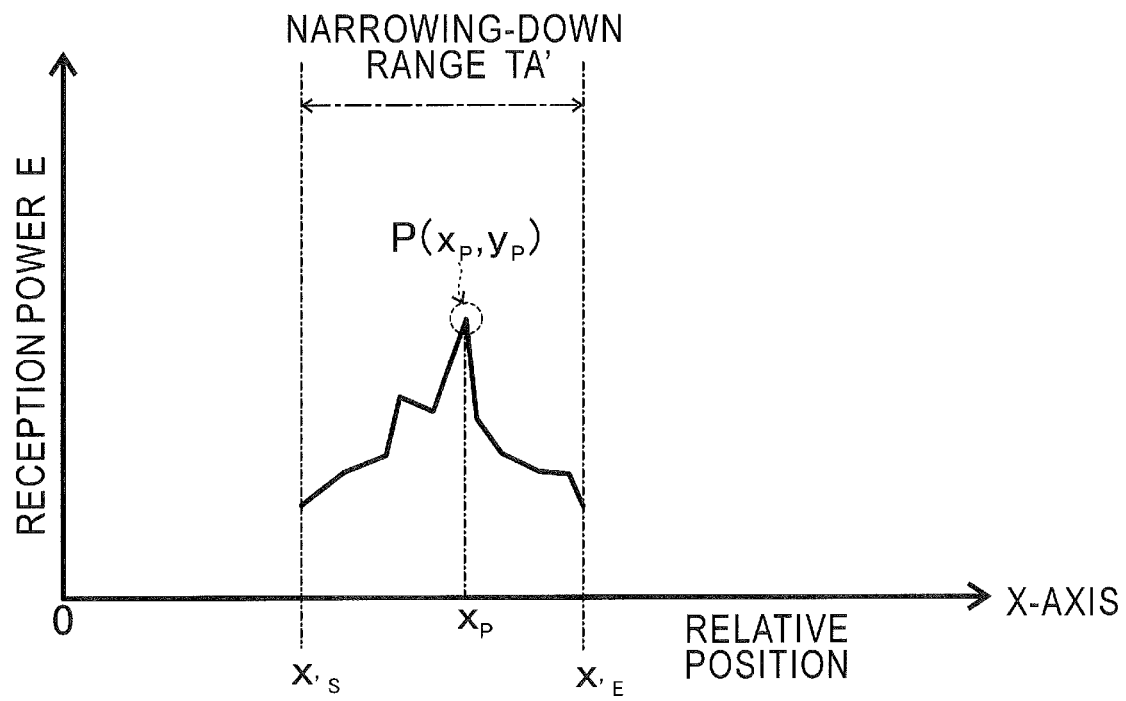
FIG. 13B is an illustration showing an example of a reception power change in an x-axis direction of a drone-radio relay apparatus in the position estimation process of the second search stage of FIG. 11.

FIG. 11 is a flowchart showing yet another example of position estimation process of the mobile terminal 40 involving beam switching in the terminal-position specifying system according to the embodiment. Each of FIG. 12A and FIG. 12B is an illustration showing an example of the flight trajectory in the upper airspace above the target area TA of the drone-radio relay apparatus 10 and the reception power change in the x-axis direction in the position estimation process of the first search stage of FIG. 11. Each of FIG. 13A and FIG. 13B is an illustration showing an example of the flight trajectory in the upper airspace above the narrowing-down range TA' of the drone-radio relay apparatus 10 and the reception power change in the x-axis direction in the position estimation process of the second search stage in FIG. 11.

In the examples of FIG. 11, FIG. 12A, FIG. 12B, FIG. 13A and FIG. 13B, by specifying the position of the mobile terminal 40 by two-stage search involving beam switching, the position estimation accuracy of the mobile terminal 40 can be improved in a shorter search time.

In FIG. 11, first, the drone-radio relay apparatus 10 is moved in the upper airspace above the target area TA of the search site, and the target area TA is made into the service area for the mobile terminal 40 (S301, S302).

Next, in the first search stage for performing the first position estimation process, the drone-radio relay apparatus 10 flies along a rough flight path (wide-area search course) F (x, y) in the upper airspace above the target area TA over the entire target area TA of the search site, transmits the radio wave St from the search antenna 110T to the ground with the first narrow beam B1 having a relatively wide beam width, and also transmits the GPS position information on its own apparatus 10 to the server 81. The mobile terminal 40 transmits to the server 81 the information on the measurement result of the reception power E of the radio waves received from the drone-radio relay apparatus 10. During the flight along the rough flight path of the drone-radio relay apparatus 10, the server 81 stores each of the GPS position information from the drone-radio relay apparatus 10 and the information on the measurement result of the reception power E from the mobile terminal 40, in association with the time information (S303).

The drone-radio relay apparatus 10 repeats the transmission of the radio wave St to the ground and transmission of the GPS position information on its own apparatus 10 to the server 81, until it flies on a flight trajectory sufficient for estimating the position of the mobile terminal 40 over the entire target area TA, and the mobile terminal 40 repeats the transmission of the information on the measurement result of the reception power E to the server 81 (S303, S304). If the altitude of the ground surface of the target area TA is changing, the drone-radio relay apparatus 10 may be flown while moving up and down so that the vertical distance between the drone-radio relay apparatus 10 and the ground surface of the target area TA is constant.

Next, when the flight trajectory of the mobile terminal 40 in the target area TA becomes a sufficient flight trajectory for narrowing down the search range (flight trajectory from flight position Fs to flight position Fe in FIG. 12A), the server 81 specifies an approximate position of the mobile terminal 40, which is the flight position coordinate P' ($x_p$, $y_p$) at which the reception power E is maximized, as shown in FIG. 12B, based on the reception power data (x, y, E) in the flight time period from the flight position Fs to the flight position Fe, and sets a narrowing-down range TA' centered on that position (S305).

Next, in the second search stage for performing the second-position estimation process, the drone-radio relay apparatus 10 flies along a fine flight path (precision search course) F' (x, y) in the upper airspace above the narrowing-down range TA' over the entire narrowing-down range TA', transmits the radio wave St from the search antenna 110T to the ground with the second narrow beam B2 having a narrower beam width, and also transmits the GPS position information on its own apparatus 10 to the server 81. The mobile terminal 40 transmits to the server 81 the information on the measurement result of the reception power E of the radio waves received from the drone-radio relay apparatus 10. During the flight along the detailed flight path of the drone-radio relay apparatus 10, the server 81 stores each of the GPS position information from the drone-radio relay apparatus 10 and the information on the measurement result of the reception power E from the mobile terminal 40, in association with the time information (S306).

The drone-radio relay apparatus 10 repeats the transmission of the radio wave St to the ground and the transmission of the GPS position information on its own apparatus 10 to the server 81, until it flies on a flight trajectory sufficient for estimating the position of the mobile terminal 40 over the entire narrowing-down range TA', and the mobile terminal 40 repeats the transmission of the information on the measurement result of the reception power E to the server 81 (S306, S307). If the altitude of the ground surface of the narrowing-down range TA' is changing, the drone-radio relay apparatus 10 may be flown while moving up and down so that the vertical distance between the drone-radio relay apparatus 10 and the ground surface of the narrowing-down range TA' is constant.

Next, when the flight trajectory of the mobile terminal 40 in the target area TA becomes a sufficient flight trajectory for position estimation (see FIG. 13A), the server 81 estimates and specifies the flight position coordinate P $(x_p, y_p)$ at which the reception power E is maximum as the position of the mobile terminal 40 as shown in FIG. 13B, based on the reception power data (x, y, E) in the flight time zone (S308).

Next, the server 81 generates a map image displaying the specified position coordinate P $(x_p, y_p)$ of the mobile terminal 40 (S309). The map image generated by the server 81 can be accessed and displayed from the operator's console apparatus 85.

As described above, according to the present embodiment, even if the mobile terminal (terminal apparatus) 40 for mobile communication is in the GPS non-receiving condition, the current position of the mobile terminal 40 can be estimated and specified.

In particular, according to the present embodiment, in case that the mobile terminal 40 is in the GPS non-receiving condition, the position of the mobile terminal 40 can be estimated (specified) only from the GPS position information on the drone-radio relay apparatus 10 and the measurement result of the reception power E of the mobile terminal 40.

Moreover, the measurement of the reception power E of the mobile terminal 40 for mobile communication is a function normally possessed by the mobile terminal 40, and no new measurement function is required.

Furthermore, since the drone-radio relay apparatus 10 typically has a GPS receiver, no new function is required.

The process steps and configuration elements of the relay station, the radio relay apparatus, the terminal apparatus (mobile terminal, user apparatus, mobile station), the server and the base station apparatus in the base station, which are described in the present description, can be implemented with various means. For example, these process steps and configuration elements may be implemented with hardware, firmware, software, or a combination thereof.

With respect to hardware implementation, means such as processing units or the like used for establishing the foregoing steps and configuration elements in entities (for example, relay station, radio relay apparatus, terminal apparatus, base station apparatus in servers and base stations, computer apparatus, hard disk drive apparatus, or optical disk drive apparatus) may be implemented in one or more of an application-specific IC (ASIC), a digital signal processor (DSP), a digital signal processing device (DSPD), a programmable logic device (PLD), a field programmable gate array (FPGA), a processor, a controller, a microcontroller, a microprocessor, an electronic device, other electronic unit, computer, or a combination thereof, which are designed so as to perform a function described in the present specification.

With respect to the firmware and/or software implementation, means such as processing units or the like used for establishing the foregoing configuration elements may be implemented with a program (for example, code such as procedure, function, module, instruction, etc.) for performing a function described in the present specification. In general, any computer/processor readable medium of materializing the code of firmware and/or software may be used for implementation of means such as processing units and so on for establishing the foregoing steps and configuration elements described in the present specification. For example, in a control apparatus, the firmware and/or software code may be stored in a memory and executed by a computer or processor. The memory may be implemented within the computer or processor, or outside the processor. Further, the firmware and/or software code may be stored in, for example, a medium capable being read by a computer or processor, such as a random-access memory (RAM), a read-only memory (ROM), a non-volatility random-access memory (NVRAM), a programmable read-only memory (PROM), an electrically erasable PROM (EEPROM), a FLASH memory, a floppy (registered trademark) disk, a compact disk (CD), a digital versatile disk (DVD), a magnetic or optical data storage unit, or the like. The code may be executed by one or more of computers and processors, and a certain aspect of functionalities described in the present specification may by executed by a computer or processor.

The medium may be a non-transitory recording medium. Further, the code of the program may be executable by being read by a computer, a processor, or another device or an apparatus machine, and the format is not limited to a specific format. For example, the code of the program may be any of a source code, an object code, and a binary code, and may be a mixture of two or more of those codes.

The description of embodiments disclosed in the present specification is provided so that the present disclosures can be produced or used by those skilled in the art. Various modifications of the present disclosures are readily apparent to those skilled in the art and general principles defined in the present specification can be applied to other variations without departing from the spirit and scope of the present disclosures. Therefore, the present disclosures should not be limited to examples and designs described in the present specification and should be recognized to be in the broadest scope corresponding to principles and novel features disclosed in the present specification.

REFERENCE SIGNS LIST

10: drone-radio relay apparatus (drone-mounted radio relay apparatus)
12: slave repeater (relay station)
20: master repeater
30: fixed base station
40: mobile terminal (terminal apparatus)
50: vehicle (radio relay vehicle)
60: artificial satellite
80: mobile communication network
81: server
85: console apparatus 110F: FL antenna (antenna for feeder link)
110S: SL antenna (antenna for service link)
110T: search antenna (narrow-beam directional antenna)

The invention claimed is:

1. A system for specifying a position of a terminal apparatus for mobile communication, comprising:
a terminal apparatus for mobile communication;
a radio relay apparatus in which a relay station is mounted on a drone, the relay station relaying a radio communication between a fixed base station of a mobile communication network and the terminal apparatus; and
an information processing apparatus provided in the mobile communication network or another communication network,
wherein the radio relay apparatus comprises:
a directional antenna having directivity in a direction toward a ground;
a GNSS reception apparatus for receiving GNSS signals from artificial satellites; and
a control apparatus for controlling to transmit radio waves from the directional antenna toward the ground, and transmit position information on the radio relay apparatus obtained based on the GNSS signal received by the GNSS reception apparatus, to the information processing apparatus, while flying in an upper airspace above a target area on the ground;
wherein the terminal apparatus comprises:
a reception measurement section for measuring a reception power or a reception quality of the radio waves transmitted from the radio relay apparatus; and
an information transmitting section for transmitting reception measurement information on a measurement result of the reception power or reception quality to the information processing apparatus, and
wherein the information processing apparatus comprises:
an information receiving section for receiving position information on the radio relay apparatus from the radio relay apparatus and receiving the reception measurement information from the terminal apparatus in a flight time period during which the radio relay apparatus flies in the upper airspace above the target area; and
a position estimating section for estimating a position of the terminal apparatus in the target area based on the position information on the radio relay apparatus and the reception measurement information.

2. The system according to claim 1,
wherein the information processing apparatus estimates a position at which the reception power or the reception quality of radio waves is maximized, as the position of the terminal apparatus, the reception power or the reception quality of radio waves being received by the terminal apparatus from the radio relay apparatus.

3. The system according to claim 1,
wherein the information processing apparatus further comprises an image generating section for generating an image that three-dimensionally displays the reception measurement information (E) in the z-axis direction at the position (x, y) of the drone-type radio relay apparatus on a planar map, or an image in which a hue, saturation or brightness at the position (x, y) of the drone-type radio relay apparatus on a planar map is changed depending on the reception measurement information (E), based on plural sets of the position information (x, y) and the reception measurement information (E) of the drone-type radio relay apparatus, the plural sets respectively corresponding to plural times in the flight time period.

4. The system according to claim 1,
wherein the system performs step by step:
a first-position estimation process for estimating the position of the terminal apparatus by the information processing apparatus by flying the radio relay apparatus, with respect to an entire target area; and
a second-position estimation process for estimating the position of the terminal apparatus by the information processing apparatus by flying the radio relay apparatus finely, with respect to a range that includes the position of the terminal apparatus estimated in the first-position estimation process and is narrower than the target area.

5. The system according to claim 1,
wherein the radio relay apparatus comprises means for switching a width of the directional beam of the directional antenna in the direction toward the ground.

6. The system according to claim 1,
wherein the system flies the radio relay apparatus so that a vertical distance between the radio relay apparatus and a ground surface of the target area is constant.

7. The system according to claim 1,
wherein, when the terminal apparatus becomes unable to receive the GNSS signal or when a function of receiving the GNSS signal is stopped, an application program automatically starts, the application program performing a process for transmitting the reception measurement information to the information processing apparatus.

8. A system comprising:
a radio relay apparatus in which a relay station is mounted on a drone, the relay station relaying a radio communication between a fixed base station of a mobile communication network and a terminal apparatus; and
an information processing apparatus for specifying a position of a terminal apparatus for mobile communication, wherein the radio relay apparatus comprises:
a directional antenna having directivity in a direction toward a ground;
a GNSS reception apparatus for receiving GNSS signals from artificial satellites;
a communication apparatus for communicating with an information processing apparatus that is provided in the mobile communication network or another communication network and specifies a position of a terminal apparatus for mobile communication; and
a control apparatus for controlling to transmit radio waves from the directional antenna toward the ground direction, and transmit position information on the radio relay apparatus obtained based on the GNSS signal received by the GNSS reception apparatus, to the information processing apparatus, while flying in an upper airspace above a target area on the ground,
wherein the information processing apparatus comprises:
an information receiving section for receiving position information on a radio relay apparatus obtained based on the GNSS signals received by the GNSS reception apparatus, from a radio relay apparatus, with respect to a flight time period during which the radio relay apparatus flies in an upper airspace above a target area on a ground, the radio relay apparatus comprising a directional antenna with directivity in a direction toward the ground, a GNSS reception apparatus for receiving GNSS signals from artificial satellites and a communication apparatus for communicating with the information processing apparatus, and receiving reception measurement information including a measurement result of a reception power or a reception quality from the terminal apparatus that measures the reception power or the reception quality of radio waves transmitted toward the ground from the directional antenna of the radio relay apparatus; and,
a position estimating section for estimating the position on the terminal apparatus in the target area based on the position information on the radio relay apparatus and the reception measurement information.

9. The system according to claim 8,
wherein the radio relay apparatus comprises means for switching a width of the directional beam of the directional antenna in the direction toward the ground.

10. The system according to claim 8,
wherein the radio relay apparatus flies so that a vertical distance between the radio relay apparatus and a ground surface of the target area is constant.

11. An information processing apparatus for specifying a position of a terminal apparatus for mobile communication, comprising:
an information receiving section for receiving position information on a radio relay apparatus obtained based on the GNSS signals received by the GNSS reception apparatus, from a radio relay apparatus, with respect to a flight time period during which the radio relay apparatus flies in an upper airspace above a target area on a ground, the radio relay apparatus comprising a directional antenna with directivity in a direction toward the ground, a GNSS reception apparatus for receiving GNSS signals from artificial satellites and a communication apparatus for communicating with the information processing apparatus, and receiving reception measurement information including a measurement result of a reception power or a reception quality from the terminal apparatus that measures the reception power or the reception quality of radio waves transmitted toward the ground from the directional antenna of the radio relay apparatus; and,
a position estimating section for estimating the position on the terminal apparatus in the target area based on the position information on the radio relay apparatus and the reception measurement information.

12. The information processing apparatus according to claim 11,
wherein the position estimating section estimates a position at which the reception power or the reception quality of radio waves is maximized, as the position of the terminal apparatus, the reception power or the reception quality of radio waves being received by the terminal apparatus from the radio relay apparatus.

13. The information processing apparatus according to claim 11, further comprising:
an image generating section for generating an image that three-dimensionally displays the reception measurement information (E) in the z-axis direction at the position (x, y) of the drone-type radio relay apparatus on a planar map, or an image in which a hue, saturation or brightness at the position (x, y) of the drone-type radio relay apparatus on a planar map is changed depending on the reception measurement information (E), based on plural sets of the position information (x, y) and the reception measurement information (E) of the drone-type radio relay apparatus, the plural sets respectively corresponding to plural times in the flight time period.

14. A method for specifying a position of a terminal apparatus for mobile communication, the method comprising:
flying a radio relay apparatus having a directional antenna with directivity in a direction toward a ground and a GNSS reception apparatus for receiving GNSS signals from artificial satellites in an upper airspace above a target area on the ground;
receiving position information on the radio relay apparatus obtained based on the GNSS signals received by the GNSS reception apparatus, from the radio relay apparatus, and receiving reception measurement information including a measurement result of a reception power or a reception quality, from the terminal apparatus that measures the reception power or the reception quality of radio waves transmitted from the directional antenna of the radio relay apparatus toward the ground, with respect to a flight time period during which the radio relay apparatus flies in the upper airspace above the target area on the ground; and estimating the position of the terminal apparatus in the target area based on the position information on the radio relay apparatus and the reception measurement information.

15. The method according to claim 14, further comprising:
estimating a position at which the reception power or the reception quality of radio waves is maximized, as the position of the terminal apparatus, the reception power or the reception quality of radio waves being received by the terminal apparatus from the radio relay apparatus.

16. The method according to claim 14, further comprising:
generating an image that three-dimensionally displays the reception measurement information (E) in the z-axis direction at the position (x, y) of the drone-type radio relay apparatus on a planar map, or an image in which a hue, saturation or brightness at the position (x, y) of the drone-type radio relay apparatus on a planar map is changed depending on the reception measurement information (E), based on plural sets of the position information (x, y) and the reception measurement information (E) of the drone-type radio relay apparatus, the plural sets respectively corresponding to plural times in the flight time period.

17. The method according to claim 14, further comprising:
performing step by step:
a first-position estimation process for estimating the position of the terminal apparatus by the information processing apparatus by flying the radio relay apparatus, with respect to an entire target area; and
a second-position estimation process for estimating the position of the terminal apparatus by the information processing apparatus by flying the radio relay apparatus finely, with respect to a range that includes the position of the terminal apparatus estimated in the first-position estimation process and is narrower than the target area.

18. The method according to claim 14, further comprising:
switching a width of the directional beam of the directional antenna in the direction toward the ground, by the radio relay apparatus.

19. The method according to claim 14, further comprising:

flying the radio relay apparatus so that a vertical distance between the radio relay apparatus and a ground surface of the target area is constant.

20. The method according to claim 14, further comprising:
automatically starting an application program for performing a process for transmitting the reception measurement information to the information processing apparatus, when the terminal apparatus becomes unable to receive the GNSS signal or when a function of receiving the GNSS signal is stopped.

\* \* \* \* \*